(12) United States Patent
Sohail et al.

(10) Patent No.: US 11,722,472 B2
(45) Date of Patent: Aug. 8, 2023

(54) METHOD FOR PROTECTING EDGE DEVICE TRUST SCORE

(71) Applicant: EMC IP Holding Company LLC, Hopkinton, MA (US)

(72) Inventors: Mohamed Sohail, Sheikh Zayed (EG); Robert A. Lincourt, Franklin, MA (US); Said Tabet, Austin, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 297 days.

(21) Appl. No.: 17/139,374

(22) Filed: Dec. 31, 2020

(65) Prior Publication Data

US 2022/0210142 A1 Jun. 30, 2022

(51) Int. Cl.
*H04L 9/40* (2022.01)

(52) U.S. Cl.
CPC .................... *H04L 63/08* (2013.01)

(58) Field of Classification Search
CPC ....... H04L 9/3239; H04L 63/08; H04L 63/00; H04L 9/50; G06F 21/30; H04W 12/06
USPC .......................................................... 726/3
See application file for complete search history.

(56) References Cited

U.S. PATENT DOCUMENTS

| | | |
|---|---|---|
| 10,057,264 B1 | 8/2018 | ElNakib et al. |
| 10,419,931 B1 | 9/2019 | Sohail et al. |
| 11,522,700 B1 * | 12/2022 | Auerbach ................ G06F 16/27 |
| 2019/0222424 A1 | 7/2019 | Lindemann |
| 2020/0007322 A1 * | 1/2020 | Weldemariam ......... G06F 16/27 |
| 2020/0127821 A1 | 4/2020 | Dolev et al. |
| 2021/0133329 A1 * | 5/2021 | Andrews ................ G06F 21/577 |

OTHER PUBLICATIONS

Enabling IC Traceability via Blockchain Pegged to Embedded PUF Md Nazmul Islam and Sandip Kundu, University of Massachusetts Amherst, USA ACM Transactions on Design Automation of Electronic Systems, vol. 24, No. 3, Article 36. Pub. date: Apr. 2019. (Year: 2019).*
International Search Report and Written Opinion received for PCT Patent Application No. PCT/US21/028147, dated Sep. 22, 2021, 12 pages.
Malik Sidra et al: "TrustChain: Trust Management in Blockchain and IoT Supported Supply Chains", 2019 IEEE International Conference on Blockchain (Blackchain), IEEE, Jul. 14, 2019 pp. 184-193.
Shala Besfort et al: "Blockchain and Trust for Secure, End-User-Based and Decentralized Iot Service Prvision", IEEE Access, IEEE, USA, vol. 8, Jun. 26, 2020 pp. 119961-119979.
*Definition of Internet Of Things (iot)*—Gartner Information Technology Glossary, https://www.gartner.com/en/glossary; Retrieved Jul. 2020.
2143 IEEE P2143, Cryptocurrency Payment Working Group https://sagroups.ieee.org/2143/ (Previously accessed Aug. 2020 at https://beyondstandards.ieee.org/tag/ieee-2143).

(Continued)

*Primary Examiner* — Benjamin A Kaplan
(74) *Attorney, Agent, or Firm* — Workman Nydegger

(57) ABSTRACT

One example method includes correlating trust scoring with authentication levels. Trust scores are protected in a computing system such that devices can be validated. Authentication levels are based on the verified trust scores.

18 Claims, 9 Drawing Sheets

(56) References Cited

OTHER PUBLICATIONS

Selvakumar, *A study on integrating IoT Applications with Blockchain*, 2019 International Conference on Computer Communication and Informatics (ICCCI—2019), Jan. 23-25, 2019, Coimbatore, India.
*Light client protocol*. https://eth.wiki/en/concepts/light-client-protocol, Ethereum, May 2016.
*A New Approach to IoT Security, 5 Key Requirements to Securing IoT Communications*, PubNub, https://www.pubnub.com/static/papers/IoT_Security_Whitepaper_Final.pdf; Retrieved Jul. 2020.
Solana, *Tangle Me Up: Why Distributed Ledgers are to be the Backbone of the IOT Ecosystem*, https://www.iotsworldcongress.com/tangle-me-up-why-distributed-ledgers-are-to-be-the-backbone-of-the-iot-ecosystem/ Retrieved Jul. 2020.
Kuzmin; *Blockchain-Based structures for a secure and operate IoT*; IEEE 2017.
*Advancing business blockchain adoption through global open source collaboration*; Hyperledger—Open Source Blockchain Technologies, https://www.hyperledger.org; Retrieved Jul. 2020.

\* cited by examiner

METHOD FOR PROTECTING EDGE DEVICE TRUST SCORE

FIELD OF THE INVENTION

Embodiments of the present invention generally relate to network and device security. More particularly, at least some embodiments of the invention relate to systems, hardware, software, computer-readable media, and methods for security operations including data and/or device related security operations.

BACKGROUND

The IoT (Internet of Things) generally refers to the billions of devices that are connected to the Internet. Many of these devices collect, generate, or share data. The range of devices connected to the Internet includes is large and includes, for example, edge data centers, endpoint devices, edge servers, and sensors. As the edge continues to evolve, the amount of data uploaded from the edge may be greater than the amount of data downloaded to the edge.

The ability to transmit data, while presenting a security concern, is not the only security concern. A device that has an IP (Internet Protocol) address will, at some point, be subject to an attack of some sort. Today, security is often the responsibility of the device itself. Consumers are responsible for ensuring that their devices are up to date with respect to software and firmware. This becomes a very complicated task over time, particularly when the manufacturers no longer provide support, fail to update code bases and libraries, and the like.

When a device is added to an edge system today, the onboarding and enrollment process is typically manual and insecure. From the manufacturer's perspective, keys and certificates such as SCEP (Simple Certificate Enrollment Protocol) are often performed manually with no attestation and without the benefit of multiple signers. From the device owner's perspective, certificate management, updates, device ownership transfers, and the like are time consuming and prone to error.

Current approaches to security deal with edge ecosystems and devices as silos, but this creates more vulnerabilities, higher risks, and overall less value in the generated data. Moreover, current security approaches complicate the management process, making it hard to address and mitigate the risks. Data theft or manipulation is one of the top threats faced by current edge deployments due to the permanent connectivity and the exposure to the Internet.

A key issue within these types of deployments is the fact that most edge ecosystems and devices within those ecosystems are very hard to authenticate and trust. For example, it is difficult to ensure that the right device is receiving the right information (updates to software, commands, data, messages, metadata, etc.) and difficult to ensure that this information is received from trusted sources.

In addition to the security of valid devices, there is also a need to protect from illegitimate or fake devices. Fake devices, for example, may attempt to attach to an ecosystem and input false data. A fraudulent server may attempt to eavesdrop on communications or issue false data or instructions into a network. Simply stated, security techniques often rely heavily on the devices themselves and this approach, in addition to its inadequacies, adds more complexity and dependency on the manufacturer of the hardware and the software.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
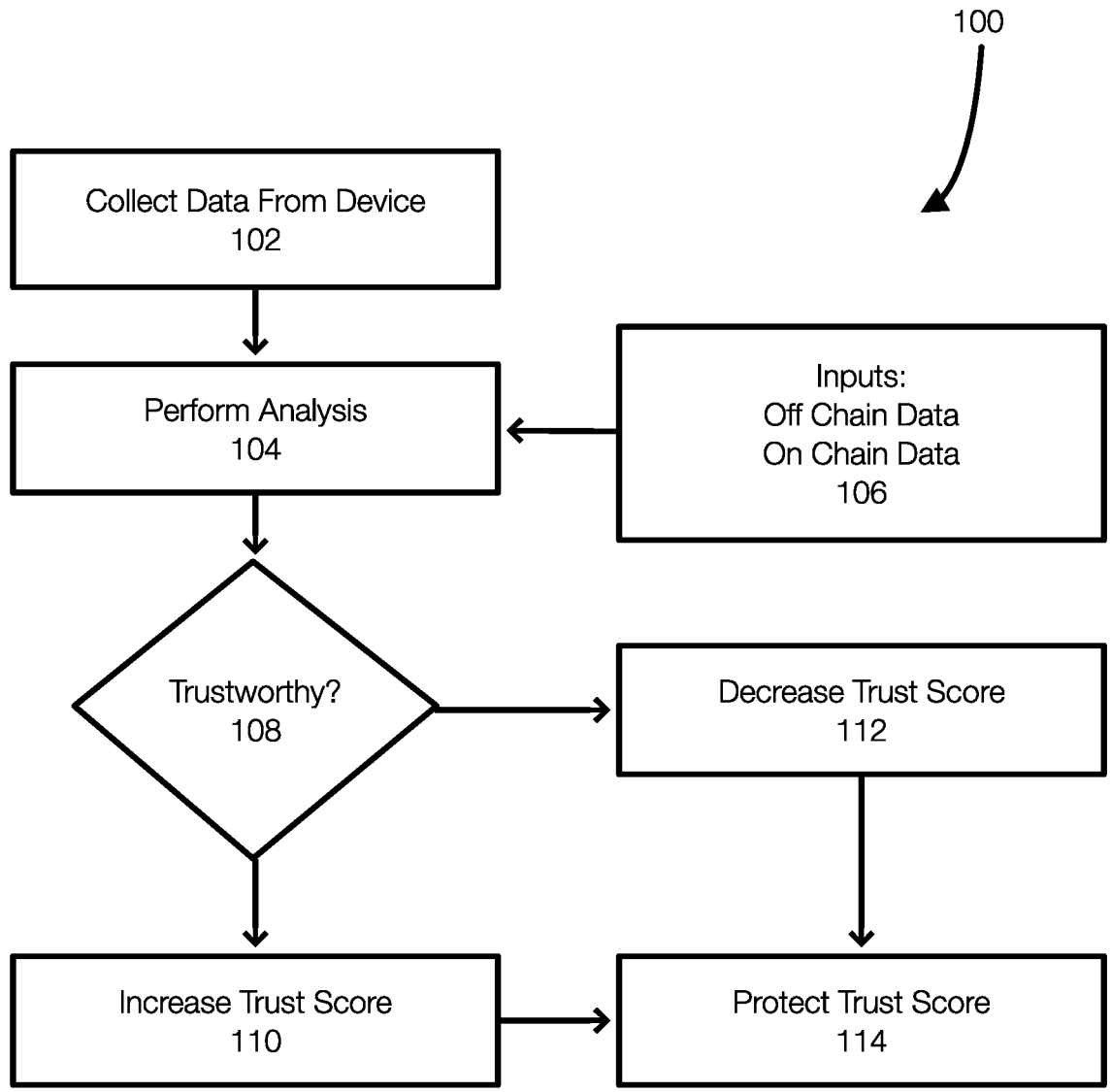
FIG. 1A discloses aspects of generating trust scores.

Embodiments of the present invention generally relate to network security, device security, and/or authentication. More particularly, at least some embodiments of the invention relate to systems, hardware, software, computer-readable media, and methods for security operation, authentication operations, security as a service (SaaS) that correlates trust scores with authentication levels, and/or combinations thereof.

In general, example embodiments of the invention relate to a Saas (referred to herein as a security platform) that may provide security as a service and that may perform or enforce security operations including, but not limited to, trust operations, trust score operations, trust score protection operations, ledger operations, trust validation operations, authentication operations, or the like or combination thereof. the security platform can replace or augment device specific security. A security platform may allow devices connected to an ecosystem (e.g., part of an edge deployment, attached to a gateway, a network) to perform security related operations based, in part, on trust scores. This is achieved, at least in part, by ensuring that the trust scores are valid. Depending on the trust scores, the security as a service may also enforce authentication requirements or levels. The trust scores and associated metadata may be recorded in an immutable distributed ledger, such as a blockchain ledger or a hyperledger.

Embodiments of the invention facilitate both security using trust scores. Generally, a trust score measures how much a device is secure. Based on the trust score, the authentication level a device must use to access/communicate with an ecosystem is determined. Embodiments of the invention protect this trust score, which can be generated from many sources. Embodiments of the invention ensure that the trust score of a device is not faked or fraudulent to ensure that the appropriate authentication level is applied to the device.

For example, a device such as a sensor my exhibit suspicious behavior for various reasons (e.g., because of its location, frequent of data access, excessive power consumption) and the security platform may then determine whether the appropriate authentication level is being applied or performed. Authentication may be required, in one example, as soon as the behavior is identified. This may determine that the device is not using the appropriate authentic action for a suspicious behavior during the onboarding process (e.g., adding the device to an ecosystem) or even after the onboarding process.

As a result of the suspicious behavior or for other reasons, the trust score of the device may be validated by examining the trust score of the device stored in an immutable ledger. This allows the security platform to determine whether the trust score of the device is accurate or faked or otherwise wrong by validating the trust score currently in use with the trust score in the ledger. If the trust scores do not match, the device can be disconnected, additional authentication can be required, or the like.

When the trust score is changed, the change is committed to the ledger as well in an authorized manner. This allows the block chain or ledger to be used for auditing purposes and allows the proper authentication level to be performed. Storing the trust score in a ledger protects the trust score.

Embodiments of the invention further facilitate the ability of ecosystems to trust devices that enter/leave ecosystems. The ability to protect trust scores and to validate trust scores can facilitate security and trust. For example, a device operating in a first ecosystem may have a trust score. If than device attempts to join a second ecosystem in which the device is unknown, the second ecosystem may not trust the device. However, if the first ecosystem trusts the second ecosystem and can validate the trust score of the device with the second ecosystem, the first ecosystem may have some trust in the device.

The first ecosystem could also validate the trust score with a ledger, if available. This demonstrates that it is not always necessary to validate a trust score with a ledger and that the security of an ecosystem can be protected using the trust scores and the trust relationships. A ledger, however, can still be used at any time. For example, if the first and second ecosystems both share a gateway device that is associated with the same ledger or that has access to a relevant ledger, the second ecosystem may be able, in addition to trusting the first ecosystem, validate the trust score of the device by accessing the ledger because the trust score of the device is likely stored in that ledger.

The security platform is configured to correlate trust scores or trust scoring with authentication. The security platform allows various levels of authentication to be applied or required based on the trust score. A comparatively high trust score may require low authentication levels while a comparatively low trust score may require higher authentication. In some instances, user interaction may be required during authentication.

Generally, a trust score may be associated with a device, a machine, an application, a server, a memory, data, or the like. The trust score of a device reflects, for example, a confidence in the performance of the sensor, confidence in the data generated by the device, or the like. The trust score may also be used to determine whether a device can participate in a workload, join a network, or the like.

In another example, a device may be deployed to or attempt to join an existing network that includes a security platform. The device may or may not be associated with a trust score. A new device joining a network (or other ecosystem), for example, may not have a trust score. In this case, the security platform cannot validate the device or its trust score and, as a result, has low trust in the device this may also result in additional authentication.

The trust score of the device may improve over time and for other reasons. For example, if the device is the same as or similar to another trusted device (both are the same type of smartphone or sensor) in the network, the device may be associated with a higher initial trust. When the device operates as expected, the trust score of the device may improve over time. The trust score of the device may be persisted in an immutable ledger maintained by, associated with, or accessible by the network or the security platform operating therein. Thus, this device becomes associated with a trust score over time that is recorded in an ledger. If this device is moved to a new network, the trust score stored in the ledger may be available for use by the security platform in the new network.

In the case of a device that has a trust score, the trust score may be from another network or may be inferred based on the device and/or the specific ecosystem. For example, the security platform may attempt to validate the trust score with the other network (as long as the other network is trusted by the current network). This may be achieved by comparing the trust score of the device (which may be provided by the device) with the trust score in the ledger of the other network or maintained by the network. If the trust score is accurate and the other network is trusted, then the device joining the network may be trusted. In either case, the trust score may also determine the needed authentication level.

In another example, a smartphone A of user A may attempt to join a network B associated with user B, who has the same type of smartphone a smartphone B. In one example, the smartphone A provides a trust score that can be validated using a ledger by the network B. When the trust score of smartphone A is validated from the ledger, the network B may trust the smartphone A at least enough to join the network B. If the trust score is not validated, additional authentication may be required before the smartphone A is allowed to join and/or operate in the network B. As an example of additional authentication, the smartphone B may receive a query asking if smartphone A can join the network and the user can respond yes or no.

Embodiments of the invention further correlate the trust score with authentication requirements or levels and ensure that the trust score is valid or can be verified. Thus, when a device is used or accessed, the trust score of the requesting device (or of the receiving device) may be used to determine a level of authentication. A trusted device may require low levels of authentication while a less trusted device may require more authentication.

A trust score can be generated based on a variety of criteria and the trust score is typically committed to a ledger, to protect from alteration of falsification. U.S. Pat. Nos. 10,097,572 and 10,057,264, incorporated by reference in their entirety, discuss examples of generating trust scores and performing security in a computing system. A trust score may be created over time based on various factors or technologies such as a vendor data, devices, the ecosystem, the operator, developers, and the like. Trust scores may generated based on various criteria such as, but not limited to, criteria outside of a computing system and criteria inside of a computing system. Criteria that may contribute to the generation of a trust score may include a boot profile, properties and data generation under normal operation, power related profiles, and the like. The data generated by the device may also be used to generate the trust score as the data is determined to be valid and used in the computing system or by an application. As data travels through a computing system, other factors may contribute to the overall trust score. For example, a trusted encryption device may encrypt the data from a outside of a computing system and criteria inside of a computing system. Criteria that may contribute to the generation of a trust score may include a boot profile, properties and data generation under normal operation, power related profiles, and the like. The data generated by the device may also be used to generate the trust score as the data is determined to be valid and used in the computing system or by an application. As data travels through a computing system, other factors may contribute to the overall trust score. For example, a trusted encryption device may encrypt the data from a device and thus contribute to the trust score of the data and/or the device that generated the data.

A trust score can increase or decrease over time. For example, a device whose operations deviates from a boot profile, a power profile, or the like may have a decrease in its trust score. A device that operates in accordance with these profiles may see its trust score increase. The changes in the trust scores may occur over time.

Trust scores or trust scoring for a device may be static initially within a computing system such as an edge ecosystem (e.g., when the device is initially deployed into the computing system). The trust scoring may also be dynamic as the device becomes involved in operations of or workloads performed in the computing system. The trust score of the device, as previously stated, may determine the authentication level required when the device attempts to communicate with another device, when the device's data is received into the computing system, or the like. For example, when an application desires to use a device, such as a sensor, or its data, the application may determine the trust score of that device. Because embodiments of the invention protect the trust score, the trust score can be validated or verified. If the trust score is validated or verified, the application may trust the device and its data. The level at which the device is trusted, however, may depend on the trust score. If a valid trust score is low, the application may require the device to authenticate in another manner. If the valid trust score is higher, lesser authentication may be sufficient. If the trust score is not valid or cannot be verified, the request may fail.

Embodiments of the invention are configured to protect the trust score or an aggregated trust score from manipulation, unauthorized changes, or the like. The trust score mare be protected using an immutable ledger to ensure that the trust score is not altered and to guarantee the authentication level needed for various devices within the ecosystem. This may include checking the sensor trust score using a respective immutable ledger value to determine the authentication level needed to proceed with any communication request or other operation.

Embodiments of the invention are able to provide security services in diverse ecosystems. While conventional security is typically focused on the device and the device manufacturer, embodiments of the invention implement a security platform or security as a service into the ecosystem or computing system itself. The security as a service is implemented into the layers of the edge or cloud system such that flexibility and scalability can be achieved.

Understanding when a trusted device is deployed into a trusted ecosystem helps distribute the risk of securing devices/sensors to the ecosystem. This distribution creates a new range of trust so even an older or lower trustworthy sensor/device can be fully trusted within a trustworthy ecosystem.

Embodiments of the invention take into consideration information that can be obtained from device behavior and utilization. This type of information can be fed back into the edge ecosystem enabling analytics and machine learning to increase the overall operations that are required in these new deployments. For edge deployments, the ecosystem and devices behavior are another dimension that can help increase the overall operations and security.

FIG. 1A illustrates an example of a method for generating, maintaining and/or protecting a trust score. The method 100 may be performed for all devices in a computing system (e.g., existing devices, new devices). The method 100 may be performed repeatedly or continuously for devices and can be adapted to accommodate devices that enter/leave the computing system. Further, the method may be performed by different layers of the network. In one example, a security platform may reside on a gateway system or device and perform various aspects of the method 100.

For a device connected to or introduced into a computing system or network, data may be received from or collected 102 from the device or from other sources by a security platform. The data collected may include information related to the manner in which the device booted, power consumption of the device, operating information, or the like. The collected data may also include data generated by the device. For example, if the device is a weather sensor, the collected data may include weather data (temperature, humidity, wind speed, etc.) in addition to data related to the operation of the device such as boot sequence and time, operating parameters, power consumption, memory usage, and the like.

The security platform may perform an analysis 104 on the collected data. In one example, the security platform may have access to input data 106. The input data may include data stored in a distributed ledger such as off chain data, on chain data, and/or other data not included in the ledger. The security platform may store or have access to device profiles, trust scores, or the like.

Generally, the off chain data refers to data generated outside of the computing system in which the device operates. The off chain data may include information such as manufacturer specifications related to a boot profile, operational parameters and operational profiles, power consumption profiles, and the like. The on chain data may include data related to the device, the data generated by the device, the operation of the device in the context of the computing system. The on chain data may be derived or generated during the performance of a workload, during operation of the device when connected, or the like.

The analysis may compare the collected data with the input data to determine 108 a trustworthiness of the device. As previously stated, this analysis may be hierarchical. For example, the security platform may rely on local trust scores or by trusting the trust scores of other trusted ecosystems. A ledger may also be consulted to validate a trust score. If the analysis 104 indicates that the device is operating normally (memory usage, power consumption, or any other characteristic or profile) and is generating appropriate data, the trust score may be increased 110. If the analysis 104 indicates a potential problem or a security concern, the trust score may be decreased 112. For example, if the device is consuming more power than the power that should be consumed given an operational context (e.g., booting, data generation), this may influence the trust score of the device. Additional authentication may be required in this scenario if there is reason to doubt the trust placed in the device or based on the trust score itself.

The trust score is protected 114. Protecting a trust score may include committing the results of the analysis 104 to the ledger. Thus, the ledger may store a trust score of the device, a history of changes to the trust score, device profiles, and the like. This ensures that the trust score can be audited as necessary.

When a device joins a network and publishes a trust score to the network, the published trust score may be validated from at least one ledger by the security platform.

Figure 1B:
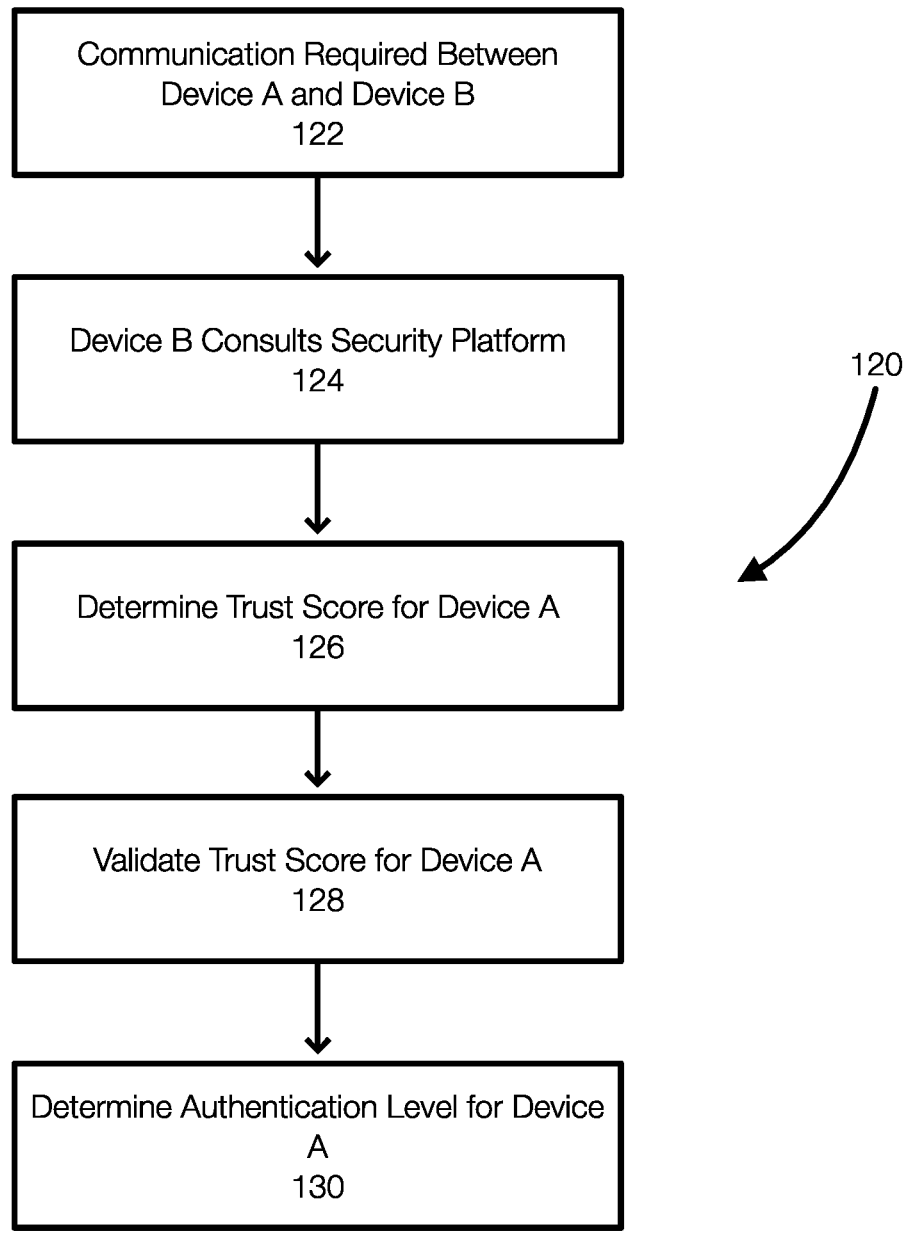
FIG. 1B discloses aspects of correlating authentication levels with trust scores.

FIG. 1B illustrates an example of a method for correlating a trust score with an authentication level. For example, communication 122 may be required between device A (requesting device) and device B (requested device). The device A may be associated with a trust score or publish the trust score to the device B. Device B consults 124 a security platform (or the ledger directly) and is able to determine 126 a trust score for device A from the ledger. The trust score for the device A may be validated 128 from an immutable ledger when the asserted trust score matches the trust score in the ledger. Based on the trust score an authentication level or requirement is determined 130. If the trust score is numerical, each authentication level may be associated with a range of trust scores. Trust scores from 0-30 may require high authentication, trust scores from 31-60 may require a medium level of authentication. Trust scores higher than 60 may require low or no authentication. Changes in the trust score may also trigger authentication.

Figure 1C:
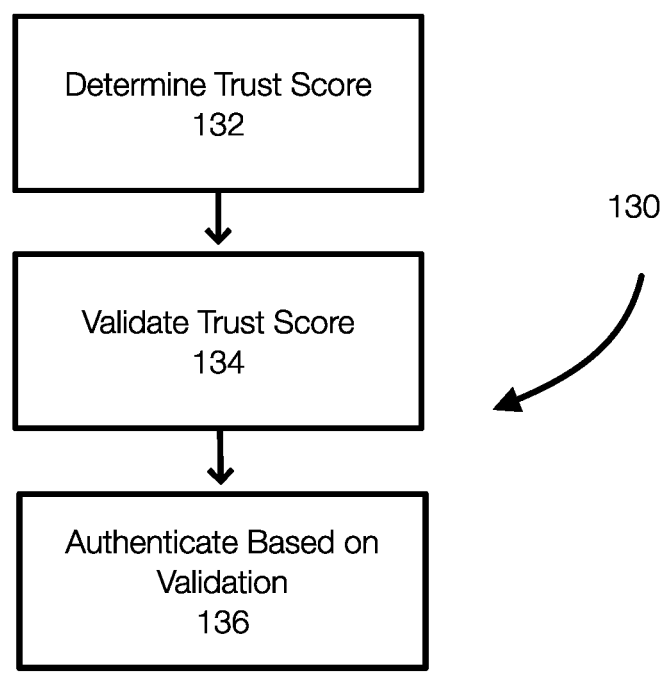
FIG. 1C discloses aspects of correlating authentication levels with trust scores.

FIG. 1C illustrates a method for correlating a trust score with an authentication level or requirement. First, a trust score is determined 132 for a device. The trust score may be obtained from a trust score database, from the device, or from another component in the computing system or from another ecosystem. The trust score 134 is then validated using a ledger. If the trust scores do not match, an error may be generated. If the trust scores match or are sufficiently close, the trust score (e.g., value) may determine the needed authentication. The immutable ledger protects trust scores such that devices can be validated and such that appropriate authentication and security can be enforced.

Figure 1D:
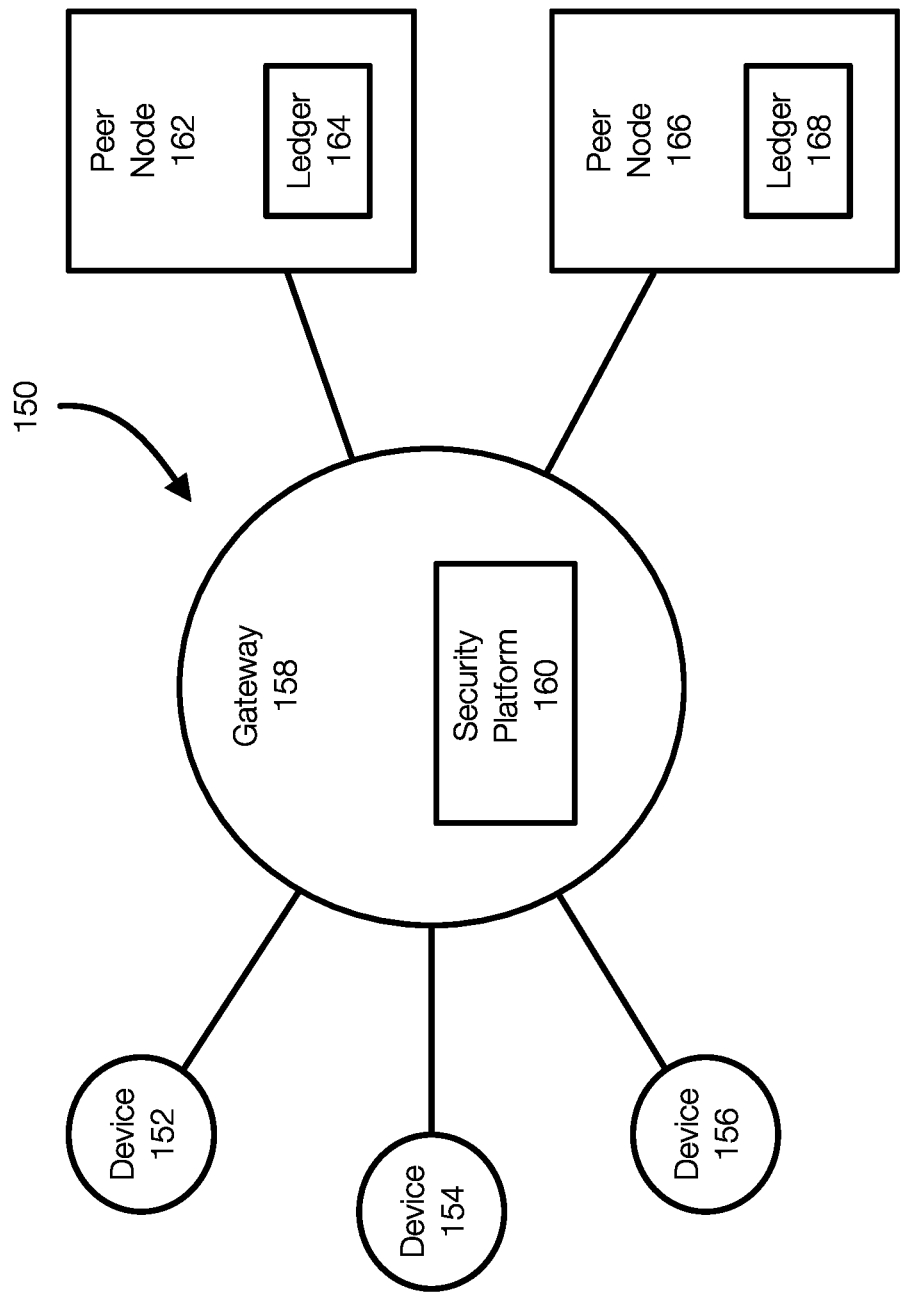
FIG. 1D discloses aspects of a computing system configured to protect trust scores.

FIG. 1D illustrates an example of a computing system configured with a security platform or in which security as a service is implemented. An ecosystem such as the computing system 150 may include, by way of example only, devices, sensors, gateway servers, gateway devices, local data centers, centralized data centers, servers, and the like. Ecosystems, however, may take various forms. For example, the WiFi system of a home or an entity may constitute an ecosystem. An ecosystem may constitute a user's laptop computer, smartphone, smartwatch, and home devices. An ecosystem may be much larger and include thousands of sensors, multiple gateways, multiple servers, which may be organized into sub ecosystems. Regardless of the configuration of the computing system 150, the security platform 160 may be integrated into various aspects or layers of the computing system 150. The security platform 160 is configured to generate and protect trust scores for at least the devices 152, 154, and 156. The security platform 160 may also initiate additional authentication when required.

The computing system 150 may also be associated with peers 162 and 166 (e.g., servers or other devices) that are configured to provide a distributed ledger, represented as the ledger 164 and 168. Part of protecting the trust scores includes storing the trust scores in a distributed ledger. Some of the devices 152, 154, and 156, and the gateway 158 may also be part of the ledger for the computing system 150 is appropriately equipped.

An ecosystem may be associated with multiple ledgers of various types. For example, devices made by a particular manufacturer may be associated with a ledger. Ledgers are not necessarily specific to a manufacturer. Thus, an ecosystem may establish its own ledger and that ledger may be made accessible to other ecosystems. This allows a first ecosystem to validate a new device that may have a trust score recorded in the ledger of a second ecosystem.

The ledger 164, 168 is configured to store trust scores. In one example, the trust score may be represented as a number (e.g., on a scale of 0 to 100). However, the information in the ledger is not limited to trust scores. The ledger 164, 168 may also store other information relevant to the computing system 150 and the devices therein. The ledger 164, 168 may store representations of transactions performed by the devices 152, 154, 156. These transactions within the network may contribute to the overall trust scores.

The ledger 164, 168 may also store information received from device manufacturers or from other sources. This information may include boot profiles, power consumption profiles, operational parameters/profiles at various time of operation and during the device life cycle, information about where the device stores information or how the device stores information in memory. This information allows the trust scores of the devices to be managed and allows various transactions to be added to the ledger.

For example, the device 152 may turn on and generate information related to the boot process such as a boot profile. This boot profile generated at boot may be compared, by the security platform 160, with a boot profile retrieved from the ledger 164, 168. If the actual boot profile matches the expected boot profile, trust in the device 152 may increase. As the device 152 is monitored over time, operational information (e.g., power consumption, battery usage, memory usage, etc.) may be collected and compared to corresponding information in the ledger 164, 168. This allows trust in the device to be increased. Similarly, a device whose information does not correlate with the information in the ledger may have its trust score decrease. Embodiments of the invention, in fact, may require further authentication. For example, if the device 152 boots in a manner that is not consistent with the boot profile stored in the ledger, the device 152 may be required to authenticate. If the device is a smartphone, the security platform 160 may require a user to provide an input of some sort (e.g., a username/password, input a code) in order to authenticate the device 152. Alternatively, the this type of authentication may not be required when the device 152 boots normally.

The devices 152, 154, and 156 may be sensors that generate data, IoT (Internet of Things) devices, smartphones, computers, sensors or the like. In some examples, the devices 152, 154, and 156 may be present in the system 150. The devices 152, 154, and 156, however, may also be added to the system 150, moved to other networks, or the like.

In one example, the data generated by the devices 152, 154, and 156 may be ingested through a gateway 158. The gateway 158 may be an edge site (e.g., a server, server cluster, a mini data center, an edge ecosystem, or the like). The gateway 158 may perform some analytics on data received from the devices 152, 154, and 156. The data received from the devices 152, 154, and 156 may include generated data or metadata such as power usage and other profile related data. This is an example of a workload, which can be monitored and used in the trust evaluation processes.

The gateway 158 may filter the data from or about the devices 152, 154, and 156, perform stream analytics, compare power profiles, boot profiles, operational profiles, memory profiles or the like with actual device generated profiles. This process allows the gateway 162 to add to the trust score of the devices 152, 154, and 156. Changes or additions to the trust score may be added to the ledger 164, 168 according to certain rules. In addition, this allows the gateway 158 to either validate the trust score and/or require some form of authentication based on the trust score.

Figure 1E:
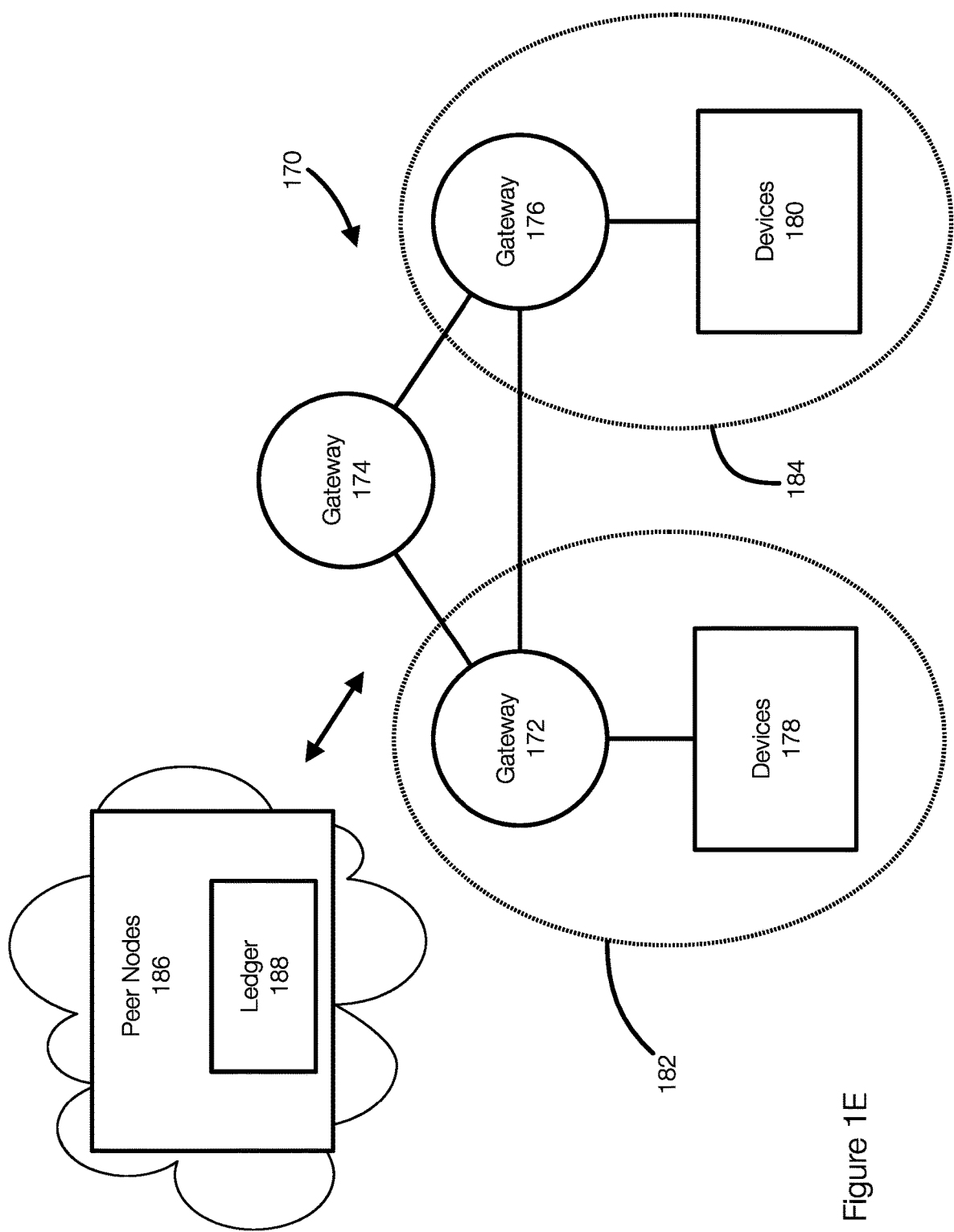
FIG. 1E illustrates examples of ecosystems that implement security platforms.

FIG. 1E illustrates an example of another computing system in which at least one security platform may be implemented. The computing system 170 includes an ecosystem 182 and an ecosystem 184. The following discussion considers examples in which the ecosystems 182 and 184 are related and examples in which the ecosystems 182 and 184 are not related. In the ecosystem 182, the devices 178 may communicate with or through a gateway 172. It is noted that communication through a gateway is not required and that computing systems may be organized in other manners.

In this example, the gateway 172 may communicate with peer nodes 186 and access the ledger 188 directly or via a gateway 174. Similarly, the gateway 176 may access the ledger 188 directly or through the gateway 174. The gateways 172 and 176 may also be able to communicate with each other. Thus, the structure of the computing system 170 can vary.

In one example, the devices 180 may be unknown to the ecosystem 182. However, it may be possible that the ecosystem 182 trusts the ecosystem 184 and the gateway 174. When this trust is present (e.g., the ecosystem 182 and 184 may be associated with trust scores or be sub-ecosystems of a larger ecosystem), this may facilitate adding devices to the devices 178. More specifically, if there is a device in the devices 180 that is similar to or the same as the device being added to the ecosystem 182, the ecosystem 182 may trust the device based on the trust score of the corresponding device in the devices 180. Even if trust is provided initially, additional authentication could be required if the trust is too low.

This is possible even if the ecosystem 182 is independent of and separate from of the ecosystem 184. The trust scores for the devices 180 may still be relevant to the ecosystem 182 when the ecosystem 184 is trusted by the ecosystem 182. In another example, the ecosystem 182 may trust a device when the security platform can access a ledger in which a trust score for the device is present.

Understanding the topology of the edge ecosystem and deployments enables additional levels of security and operation to be provided to these edge ecosystems. For example, an aggregated trust score may be used. The aggregated trust score, in one example, is a combination (e.g., average) of trust scores from multiple ecosystems or ledgers. Utilizing an aggregated score, the authentication required may example, the ecosystem 182 may trust a device when the security platform can access a ledger in which a trust score for the device is present.

Understanding the topology of the edge ecosystem and deployments enables additional levels of security and operation to be provided to these edge ecosystems. For example, an aggregated trust score may be used. The aggregated trust score, in one example, is a combination (e.g., average) of trust scores from multiple ecosystems or ledgers. Utilizing an aggregated score, the authentication required may be strengthened or weakened. Depending the on the action required of the device and the overall behavior of it, within a given ecosystem or trust zone within the edge deployment, the device may or may not have to up the level of authentication.

Returning to FIG. 1D, due to the distributed nature of these deployments the trust scores are persisted within a distributed ledger 164,168. Utilizing a ledger 164, 168 allows manufacturers to provide valid input into the overall score a device or sensor receives. This will also enable third parties or applications to perform security operations and audits of devices, behaviors and data validity. Embodiments of the invention also ensure that companies and individuals are behaving and are not altering edge data or trust scores of devices. This provides a level of integrity throughout the entire lifecycle of the device and allows for a reputation to be established by edge ecosystems and their hosting providers.

Figure 2:
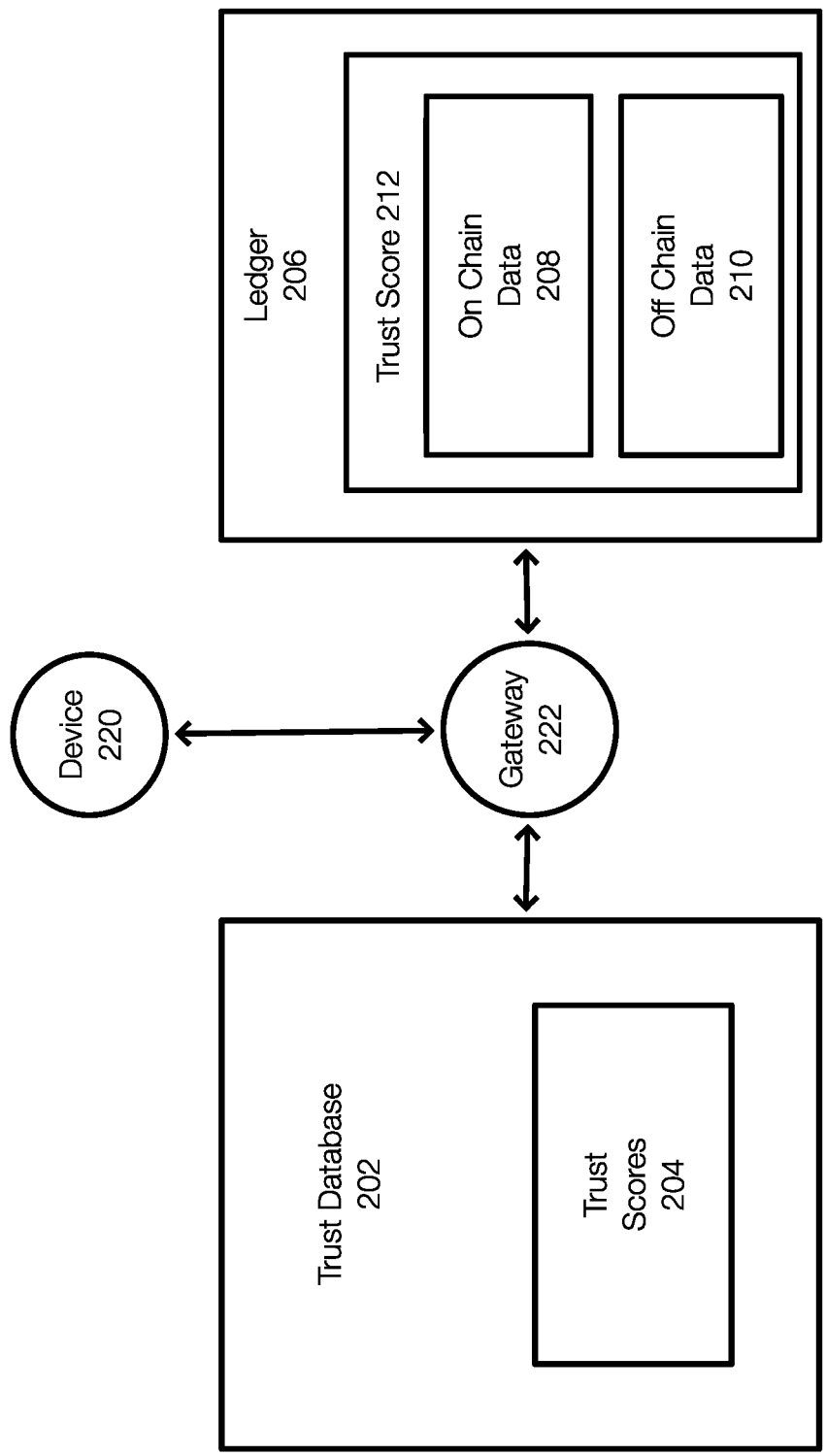
FIG. 2 discloses aspects of a trust database and a trust ledger.

FIG. 2 illustrates an example of a trust database, a distributed ledger and a device. The device 220 may be part of a computing system. The device 220 may publish a trust score to the gateway 222 that may be stored in the trust scores 204 of a trust database 202. The trust scores 204 may include a trust score for each device and the trust scores 204 are obtained from or published by devices. The trust scores 204 may also be retrieved from the ledger or from other ecosystems or sources.

When a device publishes its trust score or when a trust score of the device is obtained from some source, the gateway 222, which may implement a security platform, may validate the published trust score using the trust database 202 and/or using the ledger 206 associated with the computing system. The ledger 206 may store trust scores 212, which may be based on or include on chain data 208 and off chain data 210. Each trust score stored in the ledger 206 may correspond to a device and may be represented numerically or in another form. Multiple ledgers may be used.

When the published trust score compares favorably with the trust score in the ledger 206 (e.g., matches), authentication may proceed as required by the trust score and indicated in the ledger. As the trust score of the device changes or when an untrusted event occurs, a change in the authentication level for the device 220 may be required. For example, if the device starts operating in a manner that is not supported by the operation information stored in the ledger 206, the authentication level may be increased in accordance with a decreased trust score.

Each device in a computing system may have a consensus-based reputation or trust score and allows the variability of ecosystems to be accommodated as the trust scores are generated. As a result, a device in a first ecosystem may have a trust score that is different from the trust score of the same device in a second ecosystem.

Returning to FIG. 1D, the device 152 may be a new device that is added to the computing system 150. In order to correctly and more deeply identify if the device 152 is valid or trustworthy, the manufacturer may publish the behavior of the device 152 at different times throughout the lifecycle of the device 152. This may include a boot profile, operational profiles, data generation profiles under normal operation, a definition of normal operation, power profiles, boot profiles, and the like as previously stated. This off chain 210 information may be committed into the distributed ledger 164, 168. In one example, all devices can see the information published to the ledger 164, 168. The off chain 210 information provides data points for consideration in different ecosystems and deployments and aids in assessing trust and in determining an authentication level for the trust. Thus, at a minimum, as new devices that are placed and discovered, the core properties of the devices are added to the distributed ledger 164, 168 used by the computing system 150.

As new devices are discovered and placed in these ecosystems, the properties or profiles of the devices will be added to the distributed ledger (if not already present) utilized by the edge deployment. The information added to the ledger 164, 168 allows the security platform to take proactive measures in trusting and authenticating edge devices.

Figure 3:
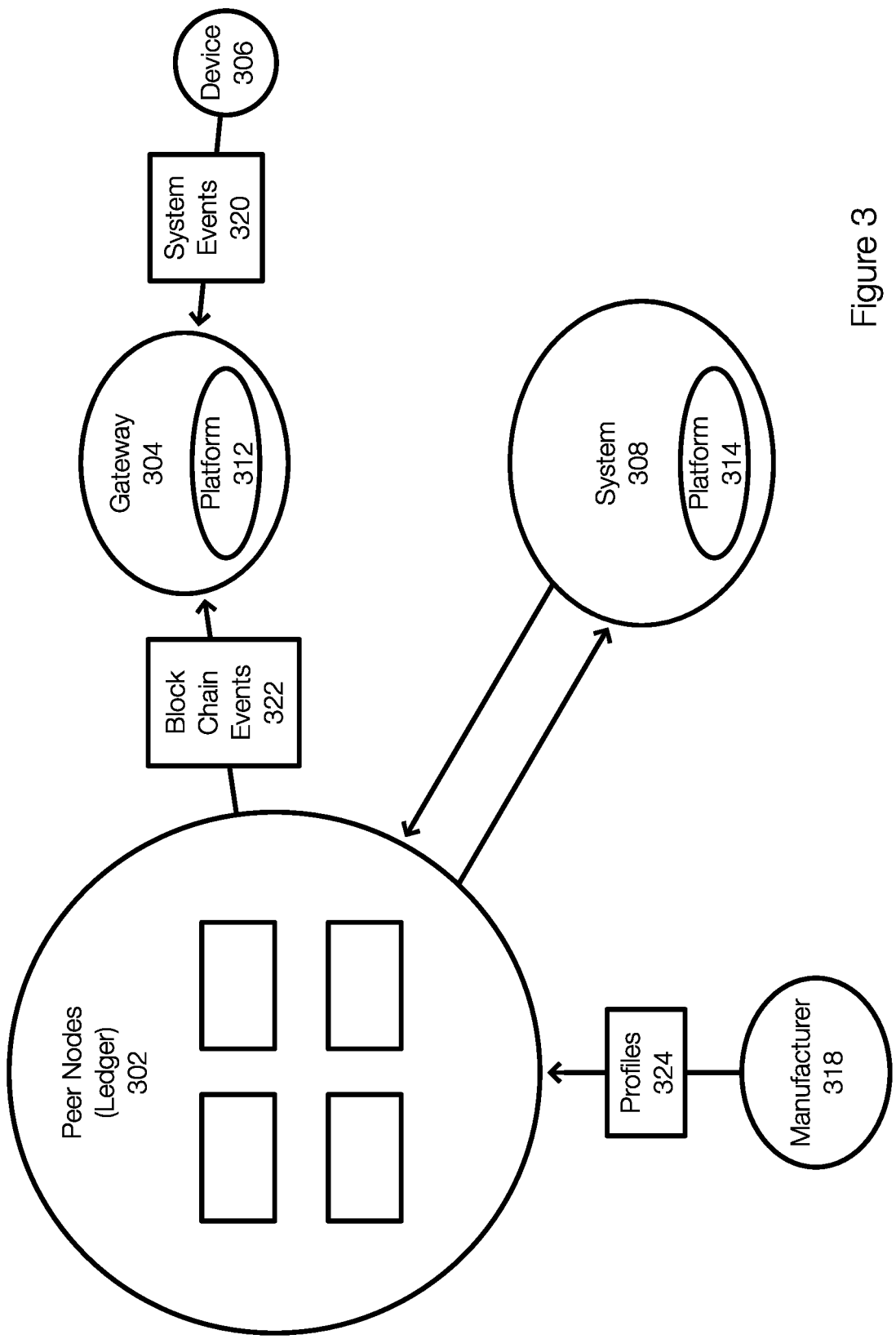
FIG. 3 discloses aspects of a method for verifying or validating trust scores, which may include device registration.

FIG. 3 discloses aspects of device registration and side channel security in a computing system. FIG. 3 illustrates peer nodes 302, which may maintain a distributed ledger. The ledger 302 may be representative of multiple ledgers, but is shown as a single ledger for convenience. The manufacturer 318 may publish profiles 324 to the ledger 302. The profiles 324 may relate to multiple aspects of device operation such as, by way of example only, boot, memory usage, socket data, battery usage, execution time, system calls, operational profiles at various points of use or lifecycle, power consumption for various device uses or actions, and the like. The ledger 302 may also store trust scores or derive a trust score from transactions committed to the ledger 302.

FIG. 3 illustrates a device 306 and a system 308, that may be part of the same ecosystem or part of different ecosystems. For example, one ecosystem may include the gateway 304 and a device 306. The ledger 302 may also be part of the ecosystem or may be accessed by the ecosystem. A security platform 312 may operate at the gateway 304 or may be distributed throughout the ecosystem. In this example, the device 306 may publish system events 320 to the gateway 304. For example, the device 306 may publish information related to a boot process, power consumption, memory usage, or the like. The nodes of the ledger 302 may similarly publish block chain events 322 to the gateway 304 or to the security platform 312. The security platform 312 could also access the ledger 302 as necessary.

In one example, the allows the security platform 312 to compare the system events 320 with the block chain events 322. The security platform 312 may compare a boot profile of the device 306 with a boot profile retrieved from the ledger 302. This allows the security platform 312 to make a trust determination regarding the device 306, which may include a change in authentication requirements.

The use of profiles and or other data can be used to determine whether the device 306 is valid. By having access to device behaviors in the ledger 302, the boot profile, device properties, data generation under normal operation, power profiles, and the like allows the gateway 304 to verify the device 306. These side channels (evaluating the trust to be placed in the device based on profiles) can help prevent an attack, for example, when abnormal operation is detected based on the profiles 324 or trigger authentication requirements. Further, deviations of the device 306 from published profiles may also cause further authentication.

For example, the gateway 304 may be a smartphone and the device 306 may be bluetooth earphones. The operation, parameters, pairing operation, operation with respect to different applications, in different temperatures or environment, or the like can be effectively monitored by the security platform 312. For example, the security platform 312 may have access to information describing the operation of the device 306 with respect to a first media application from the ledger 302. If the device 306 is subsequently used with a different media application, the operation parameters (e.g., memory usage, power usage) may change. This may cause a decrease in trust in the device 306. The security platform 312 may then either seek a block chain event related to the new application, require additional authentication, or the like. For example, the user may be required to log on to their account, receive a text and enter a code, or the like before the device 306 is allowed to join the ecosystem or operate therein.

The system 308 may be another ecosystem. In this example, the system 308 may have sufficient memory or other hardware capabilities such that the system 308 can interact directly with the ledger 302. In other words, a gateway device or system may or may not be needed in some examples. For example, the system 308 may be a laptop computer, or other smart device, or other device. The system 308 can request information from the ledger 302 or receive information that is essentially pushed by the ledger 302.

Figure 4:
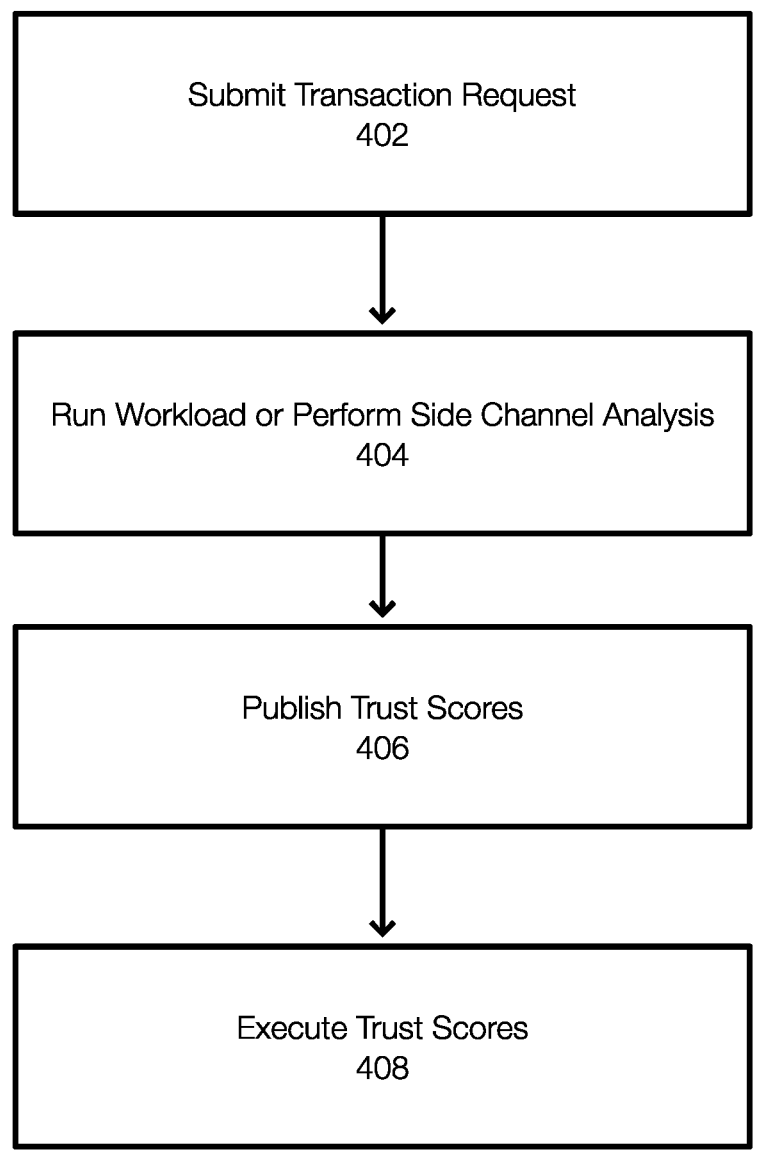
FIG. 4 discloses aspects of a method for protecting and/or validating trust scores.

FIG. 4 discloses aspects of device registration. In a computing system that includes a security platform, the registration process can begin by submitting 402 a transaction request through a client application. The request may contain a list of devices (e.g., sensors) that need to be registered to the computing system to start serving for a designated or designed purpose.

When a new device is deployed into the computing system, there may not be any current knowledge or score to help validate the device or to validate the identity of the device. The computing system may choose to run an initial workload or monitor the device based on side channels such as profiles for the device. The information collected about or from the device can be compared with the information published about the device from the industry or the manufacturer. The ecosystem or operator can choose to run 404 an initial workload or monitor the device based on the side channel profiles discussed herein. The operational data associated with the initial or test workload can then be compared against the latest published information from the industry about this device. The trust score of the device may be generated over time and may change over time.

Once the trust scores are generated, the trust scores can be published 406. More specifically, the security platform may publish the trust scores, the device may publish its own score, or the like. For example, a device in an ecosystem may publish its score to the ecosystem or, more specifically, to the security platform, to another device, or the like. The published score can then be validated. The score may be validated. In one example, each endorsing peer may generate a validation trust score using an arbitrary set of inputs. Each endorsing peer may use a different set of inputs. A validation trust score is generated from these arbitrary inputs and the validation trust score is encrypted using a secret key. In this example, the validation trust scores are being generated for the devices being registered with the network.

The endorsing peers, after encrypting the validation trust scores, may persist the encrypted validation trust scores in the ledger. The generated trust scores may then be sent to the application, which may reside in an edge node.

Next, the trust score is executed 408. When the application receives the trust scores from the endorsing peers, the application (e.g., the security as a service or the security platform) may access an application programming interface (API) to execute those scores. More specifically, each trust score is packaged along with the expected output of the that score. All the trust score results objects are then packaged into a validation results along with the device identifier and used to invoke the validation result transaction on all endorsing peers. Each endorsing peer iterates the process, decrypts the expected result and compares the expected result to the calculated result. If the decryption or comparison fails, an error is generated, otherwise execution may proceed and registration is completed.

Figure 5:
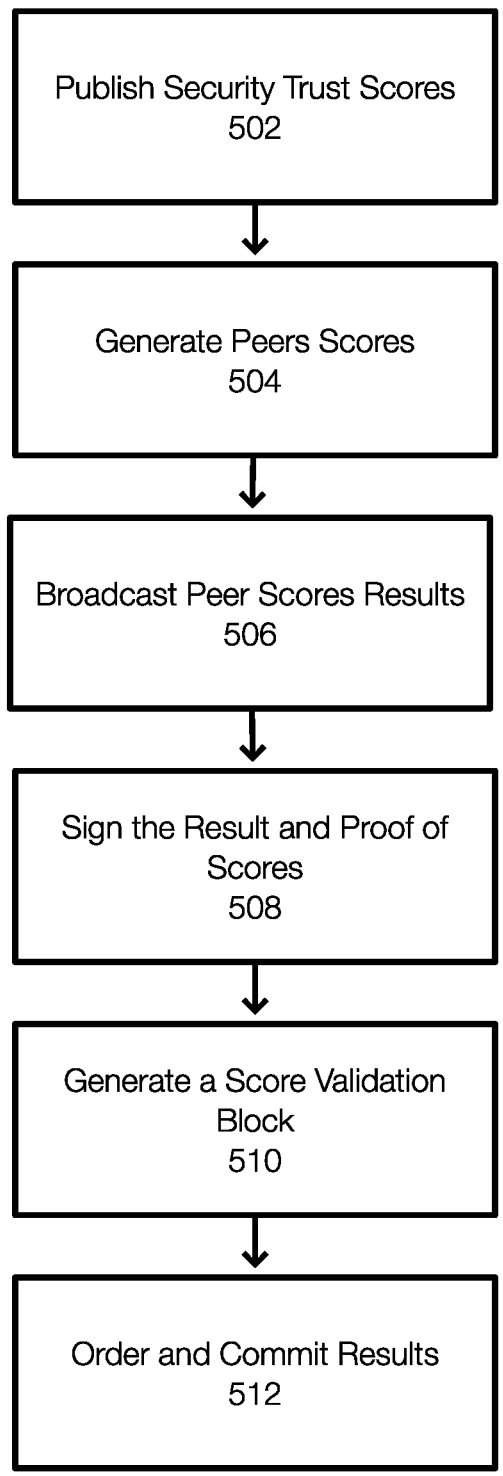
FIG. 5 further discloses aspects of protecting and validating trust scores and/or registering devices in networks.

The registration process or ongoing monitoring of the device, more specifically, may proceed as follows. FIG. 5 illustrates an example of the registration process. When a new device (e.g., a sensor) needs to join a computing system, the factors used to determine an initial trust score may include trust derived from an initial workload, based on profiles or side channels, based on the trust given to the same or similar device in other trusted ecosystems. The trust score may be generated as the device operates and is typically generated over time.

In FIG. 5, a security platform or service (e.g., operating in an ecosystem such as an edge network or computing system) may publish 502 security trust scores, based on multiple security factors, to endorsing peers such as a gateway, servers, server trusting clients, and the like. More specifically, the trust score may be published by the device itself and/or by a gateway. The validation process may publish the trust score to endorsing peers. In this example, the endorsing peers may constitute the ledger or may simply be entities trusted by the requesting security platform.

Next, trust scores are generated 504. Generating trust scores can include various operations including validating the trust score received from the security platform or the computing system. The endorsing peers may also generate an overall trust score or an average trust score for those types of devices. During this process, the workloads performed by the device may be monitored. In this context, the endorsing peers may return 404 a trust score from their ledgers or may return trust scores for similar devices.

In other words, generating scores may include scores of other devices with which the device being registered interact. For example, a device in a first ecosystem may need to interact with a device in a second ecosystem. Thus, these two devices communicate across networks and may be associated with different gateways. An example may be a fire detection sensor on one floor and another fire detection sensor on another floor. There may be need for these two sensors to communicate. Thus, the first detector may broadcast the trust score of the second detector.

A trust score is broadcasted 506 to the endorsing peers. The endorsing peers that have a trust score may respond with a signed result 508 about that device. This may also include proof of the score and that the score broadcast was correct.

The device then generates 510 a validation block that the score of the other device is correct. This is transmitted to the endorsing peers and the endorsing peers may validate the scores and commit 512 the event to the ledger.

A combination of on-chain information, information that is stored in a trusted persistent ledger, and off-chain information, sourced from other systems, possibly not backed by ledger technology is used in generating and verifying or validating trust scores.

For example, if a single device or sensor is detected within an edge ecosystem, the data generated from it could be tagged on 'not validated' or 'low trust' in the data stream or within the ecosystem itself. As more devices enter the ecosystem or as that single device shows consistency in its data and behavior the on-chain reputation could go up and the data now tagged as 'semi-validated' or 'medium trust'. These ratings can also be affected by how the data is being consumed. If systems and users are satisfied with the data, they are validating the device out-of-band and the edge ecosystems can take this usage and start to favor the device(s) and data more or, in other words, exhibit more trust in the device and its data.

Embodiments further relate to a trustable trust scoring mechanism that represents the trust levels between devices in the cluster or between clusters themselves. Whenever authentication is needed between 2 devices, or a device wants to read data from another source, a procedure is followed as previously described. More specifically, the trust score for the device and the trust score obtained from the gateway are obtained to determine a proper course of action and to choose an appropriate authentication level. Thus, the selection of the authentication level occurs based on the on ledger trust score in one example.

The ledger stores an immutable record of this trust score in case there is a change of in the authentication level need. For example, a trust score level has been changed for a particular sensor before this sensor interacts other sensors or devices in the network. As a result, the previous trust score and the device's trustworthiness will be verified using the ledger.

In one example, when multiple devices are working in an edge ecosystem. The reputation of each device will have an impact on how many authentication steps or processes you might have to be performed to establish yourself within the ecosystem.

Full authentication is needed for blockchain sensor identity verification and then password and token if the trust score is low. For example, devices may not have been authenticated recently in the edge ecosystem. As a result, full authentication may be needed. For example, if your mobile telephone has not been authenticated, full authentication may be needed to activate a smart watch, or a car.

Medium authentication is a lower security level than full authentication and may be activated for a medium total trust score. When you have few of your devices authenticated in your cluster. For example, a user's smart phone and smart fitness wrist band may be authenticated and there is a need to authenticate a laptop.

Light authentication is a simple security level for high trust scores. For example, when a user has all or most of his/her devices authenticated and nearby and it is necessary to access a smart car or login to a smart transportation system.

By correlating and connecting the off-chain unified monitoring of the edge ecosystem to the devices' trust scores, the devices' peers in the same ecosystem can access each other's primary distributed ledger. Thus, any peer device is able to participate in the reputation calculation along with the edge gateway node, which represents the security service provider for the sensors for the other devices based on its verified profile and the overall reputation.

A device may have an initial configuration and an initial trust score. The operational condition and activity may change the score. In one example, the size of the ledger may be limited. There is no standard need for continuous recording of blocks. If such an objective takes place, for example, for audit purposes, then a blockchain repository can be created. But devices will update blocks after time=t. Which is equal to the length of the technological cycle or the time of continuous operation of the IoT-devices in one example.

Embodiments of the invention integrate end devices and gateways to a ledger based infrastructure. The gateway may be a full ledger node for the end devices. This allows the gateway to route data and verify integrity. The gateway may be a thin client that only stores relevant data fragments. The end devices may be battery powered, server-trusting clients, or the like.

A peer edge deployment can also help build the reputation of a device of similar properties (best case scenario would an identical device) and similar ecosystem reputation. In this scenario, the device could be put in a pending state enabling other edge ecosystems to weigh in on the device and even provide additional properties and/or behaviors of the device in question. Once the edge ecosystem in question feels it has achieved enough knowledge about a device and achieved consensus, the edge ecosystem can either choose to full accept the device as a trusted entity or require it to have slightly different behaviors then others in the ecosystem.

In one example, a device can build trust in an ecosystem over time. Trust is built when the operation of a device conforms with the profiles stored in the ledger. Trust is built when the data from the device is accurate or similar to other devices. Generally, a trust score of a device can be validated when the device joins a network, or at any other time. The trust score of the device, which may be published by the device itself, stored by the security platform, obtained from another ecosystem, or the like can be verified. This may include sending the score to a peer node (which has a ledger or has access to a ledger). This may also include sending scores of other similar devices to the peer nodes. The peer nodes can validate all of the scores, generate an aggregated score for that type of device, validate the device score, and the like. The result can be validated and committed to the ledger. Various communications, as discussed herein, may occur between the devices, the security platform and the peer nodes. The order and number of communications can also vary. Generally, the security platform or other devices may be able to validate the trust score of a device, which is protected in an immutable ledger. This allows the trust score to be validated such that the ecosystems are protected from bad devices and such that enhanced authentication can be performed based on the trust score.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, security and trust operations.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1

A method, comprising: generating a trust score for a device based on a workload performed by the device in a computing system, submitting a transaction request through an application to register the trust score of the device, validating the trust score with endorsing peers that implement a ledger that stores immutable trust scores, receiving trust scores from endorsing peers for peer devices, generating a validation block for the trust score of the device that validates the trust score, and committing the trust score to the ledger.

Embodiment 2

The method of embodiment 1, further comprising using side channel profiles to generate the trust score for the device.

Embodiment 3

The method of embodiment 1 and/or 2, wherein the side channels include one or more of a boot profile, a socket profile, operational profile, operational profiles over a lifecycle of the device, a power consumption profile, or combination thereof.

Embodiment 4

The method of embodiment 1, 2, and/or 3, further comprising increasing or decreasing the trust score based on whether the device deviates from the side channel profiles.

Embodiment 5

The method of embodiment 1, 2, 3, and/or 4, further comprising publishing the side channel profiles to the ledger.

Embodiment 6

The method of embodiment 1, 2, 3, 4, and/or 5, wherein validating the trust score includes receiving trust scores for the peer devices from other trusted networks or other ledgers.

Embodiment 7

The method of embodiment 1, 2, 3, 4, 5, and/or 6, further comprising broadcasting trust scores of the peer devices to the ledger and/or other ledgers for validation.

Embodiment 8

The method of embodiment 1, 2, 3, 4, 5, 6, and/or 7, further comprising validating a trust score of a device in a different computing system.

Embodiment 9

A method comprising: receiving a trust score of a device connected to or joining a computing system, and trusting the device based on a trust between the computing system and a second computing system that was previously associated with the device or with a type of the device.

Embodiment 10

The method of embodiment 9, further comprising validating the trust score with at least one ledger.

Embodiment 11

The method of embodiment 9 and/or 10 wherein trust in the device in the computing system is based on one or more of trust scores of peer devices, trust scores stored by a security platform operating in the computing system, trust in devices connected to related computing systems, compliance of the device with profiles including a boot profile, or combination thereof.

Embodiment 12

The method of embodiment 9, 10, and/or 11, further comprising performing authentication in accordance with the validated trust score and requiring additional authentication when the trust score decreases or when the device does not comply with profiles stored in the at least one ledger.

Embodiment 13

A method for performing any of the operations, methods, or processes or any portion of any of these disclosed herein.

Embodiment 14

A method for performing any of the operations, methods, or processes or any portion of embodiments 1-13.

Embodiment 15

A non-transitory computer readable medium comprising computer executable instructions for performing operations of any one or more of the embodiments 1-14 or portions thereof.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the disclosure and Figures, and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In the example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    generating a trust score for a device based on a workload performed by the device in a computing system and side channel profiles;
    submitting a transaction request through an application to register the trust score of the device;
    analyzing the trust score with endorsing peers that implement a ledger that stores immutable trust scores;
    based on the analysis and whether the device deviates from the side channel profiles, increasing or decreasing the trust score;
    receiving trust scores from endorsing peers for peer devices;
    generating a validation block for the trust score of the device that validates the trust score; and
    committing the trust score to the ledger.

2. The method of claim 1, further comprising generating side channel profiles.

3. The method of claim 1, wherein the side channel profiles include one or more of a boot profile, a socket profile, operational profile, operational profiles over a lifecycle of the device, a power consumption profile, or combination thereof.

4. The method of claim 1, further comprising publishing the side channel profiles to the ledger.

5. The method of claim 1, wherein validating the trust score includes receiving trust scores for the peer devices from other trusted networks or other ledgers.

6. The method of claim 1, further comprising broadcasting trust scores of the peer devices to the ledger and/or other ledgers for validation.

7. The method of claim 1, further comprising validating a trust score of a device in a different computing system.

8. A non-transitory computer readable medium comprising computer executable instructions for performing operations, the operations comprising:
    generating a trust score for a device based on a workload performed by the device in a computing system and side channel profiles;
    submitting a transaction request through an application to register the trust score of the device;
    analyzing the trust score with endorsing peers that implement a ledger that stores immutable trust scores;
    based on the analysis and whether the device deviates from the side channel profiles, increasing or decreasing the trust score;
    receiving trust scores from endorsing peers for peer devices;
    generating a validation block for the trust score of the device that validates the trust score; and
    committing the trust score to the ledger.

9. The non-transitory computer readable medium of claim 8, further comprising generating side channel profiles.

10. The non-transitory computer readable medium of claim 8, wherein the side channel profiles include one or more of a boot profile, a socket profile, operational profile, operational profiles over a lifecycle of the device, a power consumption profile, or combination thereof.

11. The non-transitory computer readable medium of claim 8, further comprising publishing the side channel profiles to the ledger.

12. The non-transitory computer readable medium of claim 8, wherein validating the trust score includes receiving trust scores for the peer devices from other trusted networks or other ledgers.

13. The non-transitory computer readable medium of claim 8, further comprising broadcasting trust scores of the peer devices to the ledger and/or other ledgers for validation.

14. The non-transitory computer readable medium of claim 8, further comprising validating a trust score of a device in a different computing system.

15. A non-transitory computer readable medium comprising computer executable instructions for performing operations, the operations comprising:
    receiving a trust score of a device connected to or joining a computing system, wherein the trust score was generated based on a workload performed by the device in the computing system and side channel profiles and the trust score was increased or decreased based on an analysis and whether the device deviated from the side channel profiles; and
    trusting the device based on a trust between the computing system and a second computing system that was previously associated with the device or with a type of the device.

16. The non-transitory computer readable medium of claim 15, further comprising validating the trust score with at least one ledger.

17. The non-transitory computer readable medium of claim 16, wherein trust in the device in the computing system is based on one or more of trust scores of peer devices, trust scores stored by a security platform operating in the computing system, trust in devices connected to related computing systems, compliance of the device with profiles including a boot profile, or combination thereof.

18. The non-transitory computer readable medium of claim 16, further comprising performing authentication in accordance with the validated trust score and requiring additional authentication when the trust score decreases or when the device does not comply with profiles stored in the at least one ledger.

* * * * *